Sept. 24, 1940.  A. COMPER  2,215,636
HOSPITAL BED
Filed April 6, 1938  9 Sheets-Sheet 1
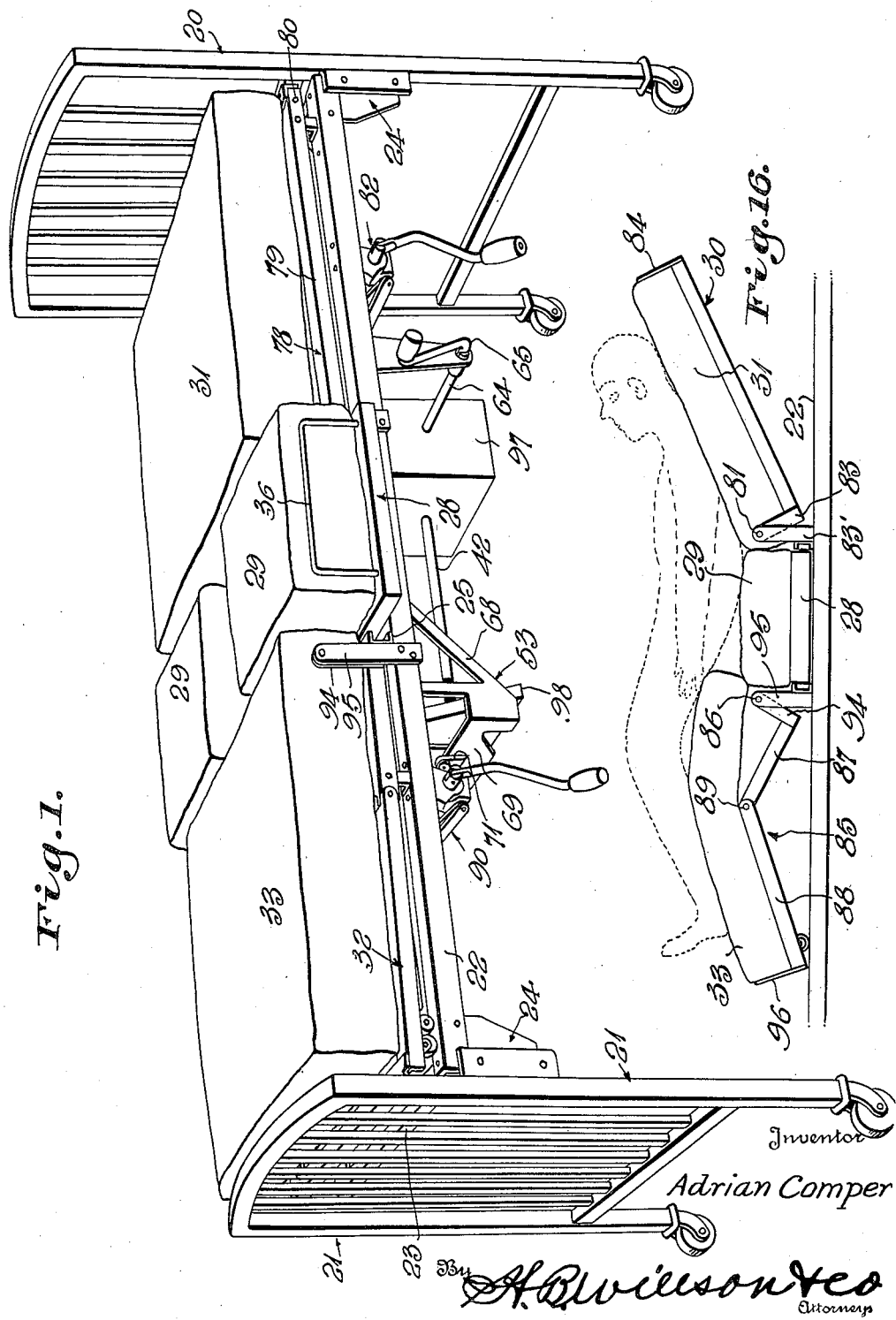

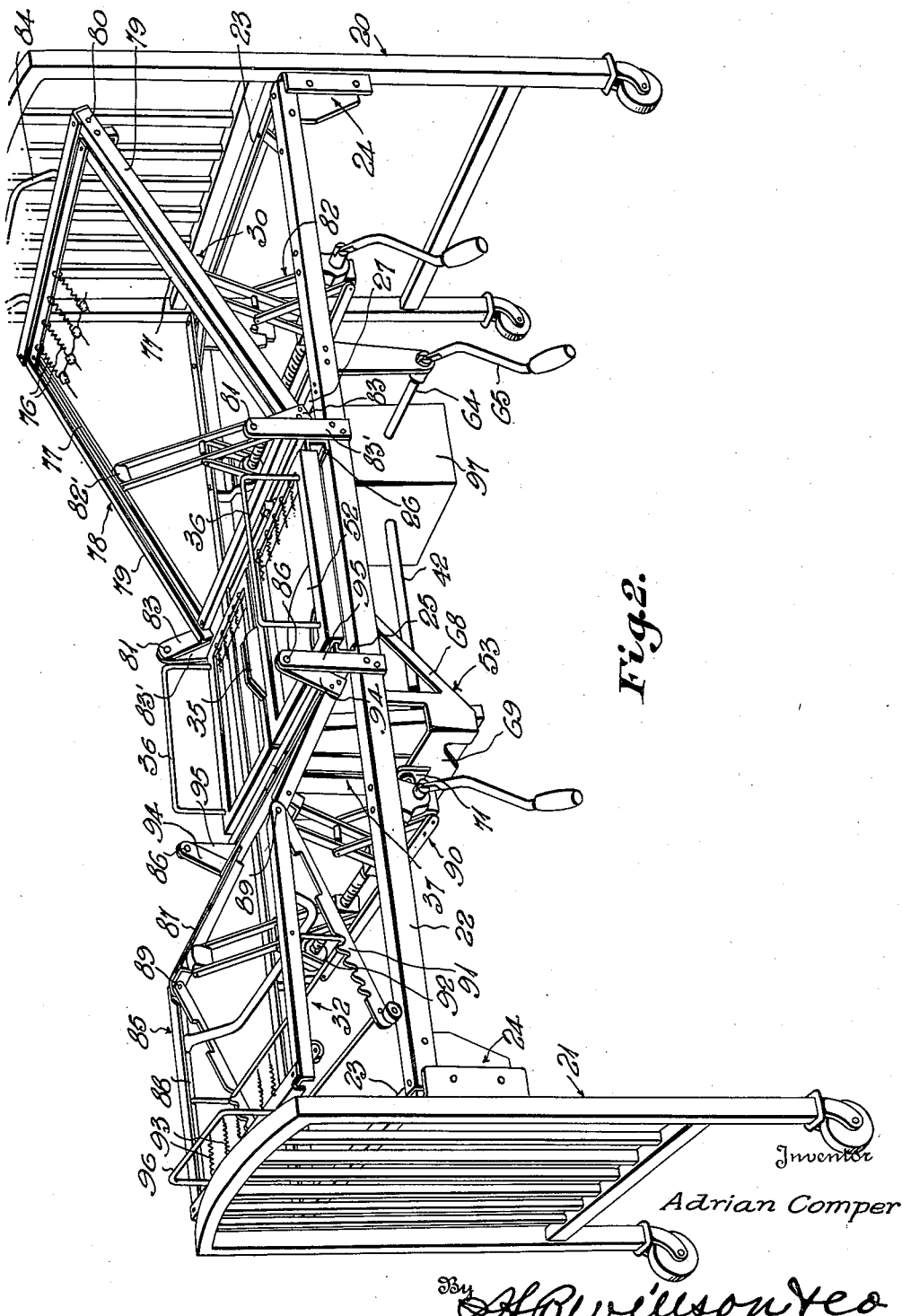

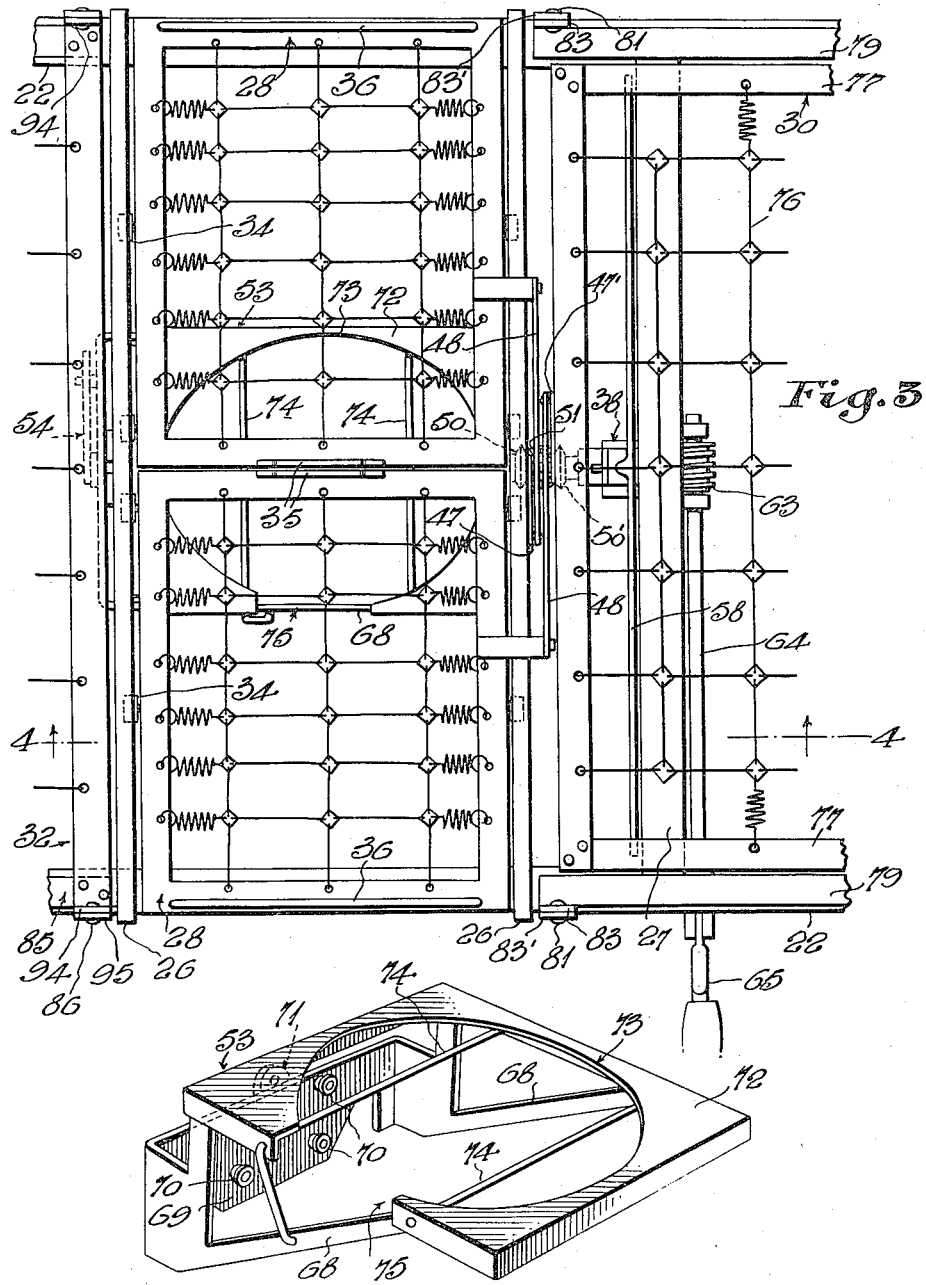

Sept. 24, 1940.                A. COMPER                    2,215,636
                              HOSPITAL BED
                           Filed April 6, 1938           9 Sheets-Sheet 4
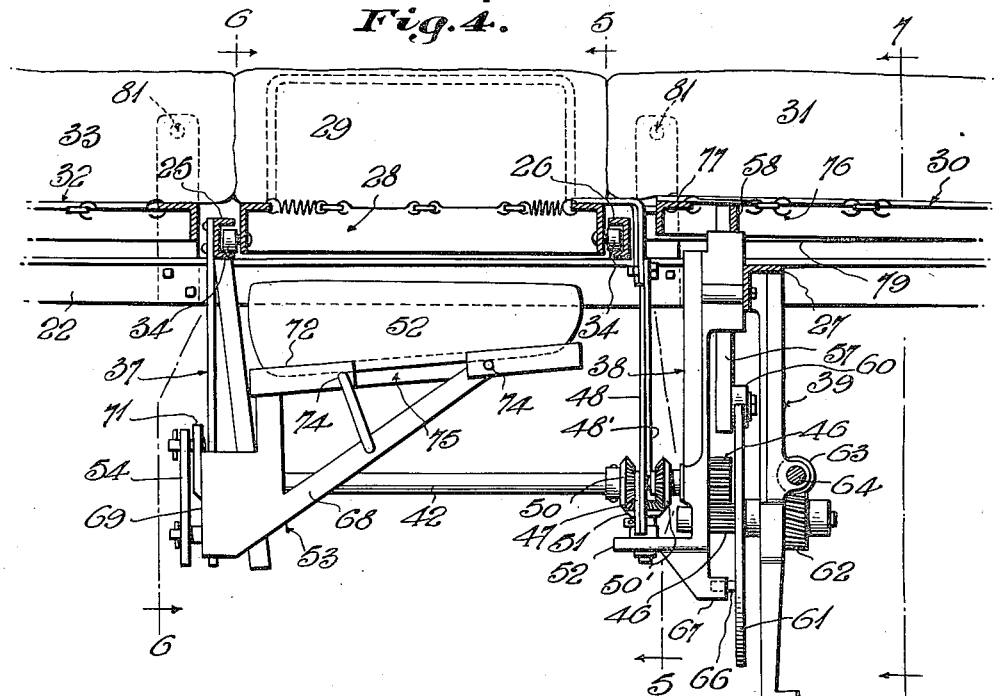
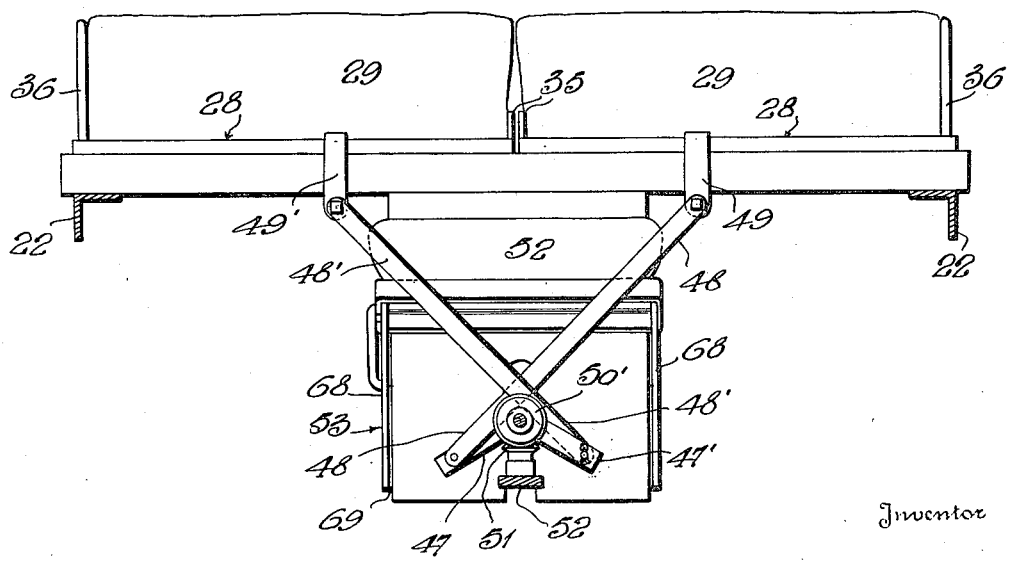
Inventor
Adrian Comper
By H. B. Willson & Co.
Attorneys Sept. 24, 1940.  A. COMPER  2,215,636
HOSPITAL BED
Filed April 6, 1938  9 Sheets-Sheet 5
Fig. 6.
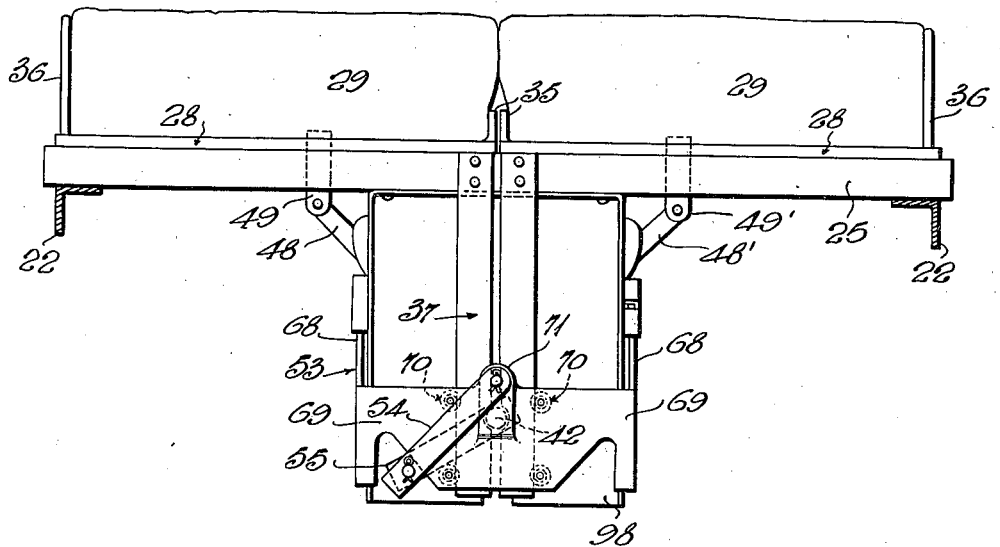
Fig. 7.
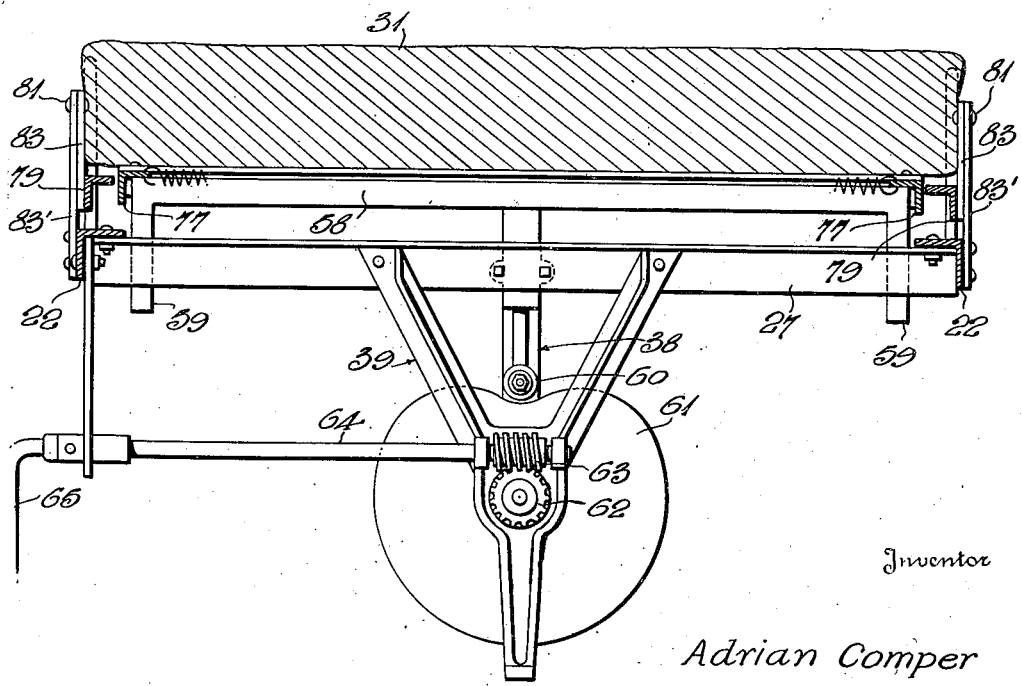
Inventor
Adrian Comper
Attorneys

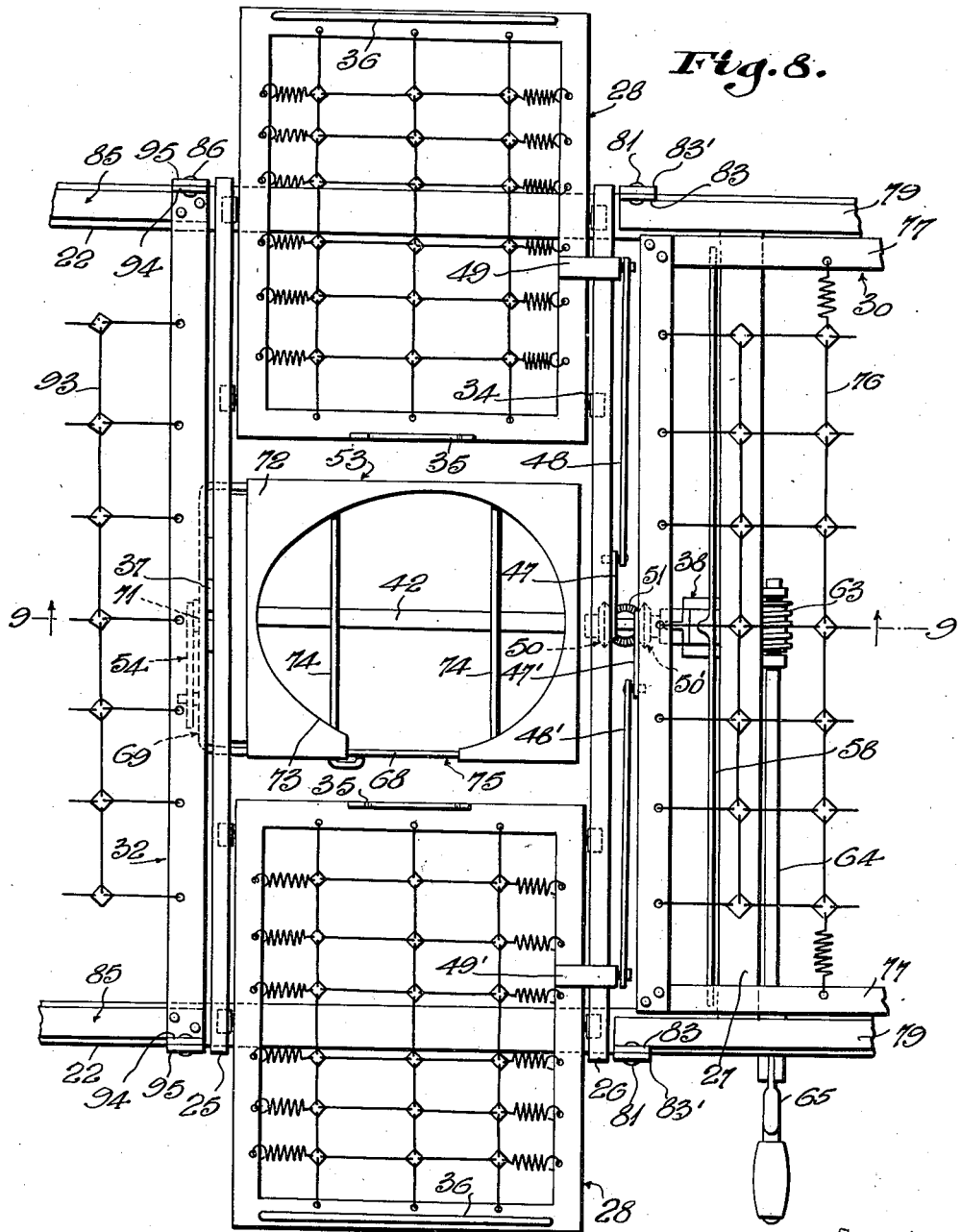

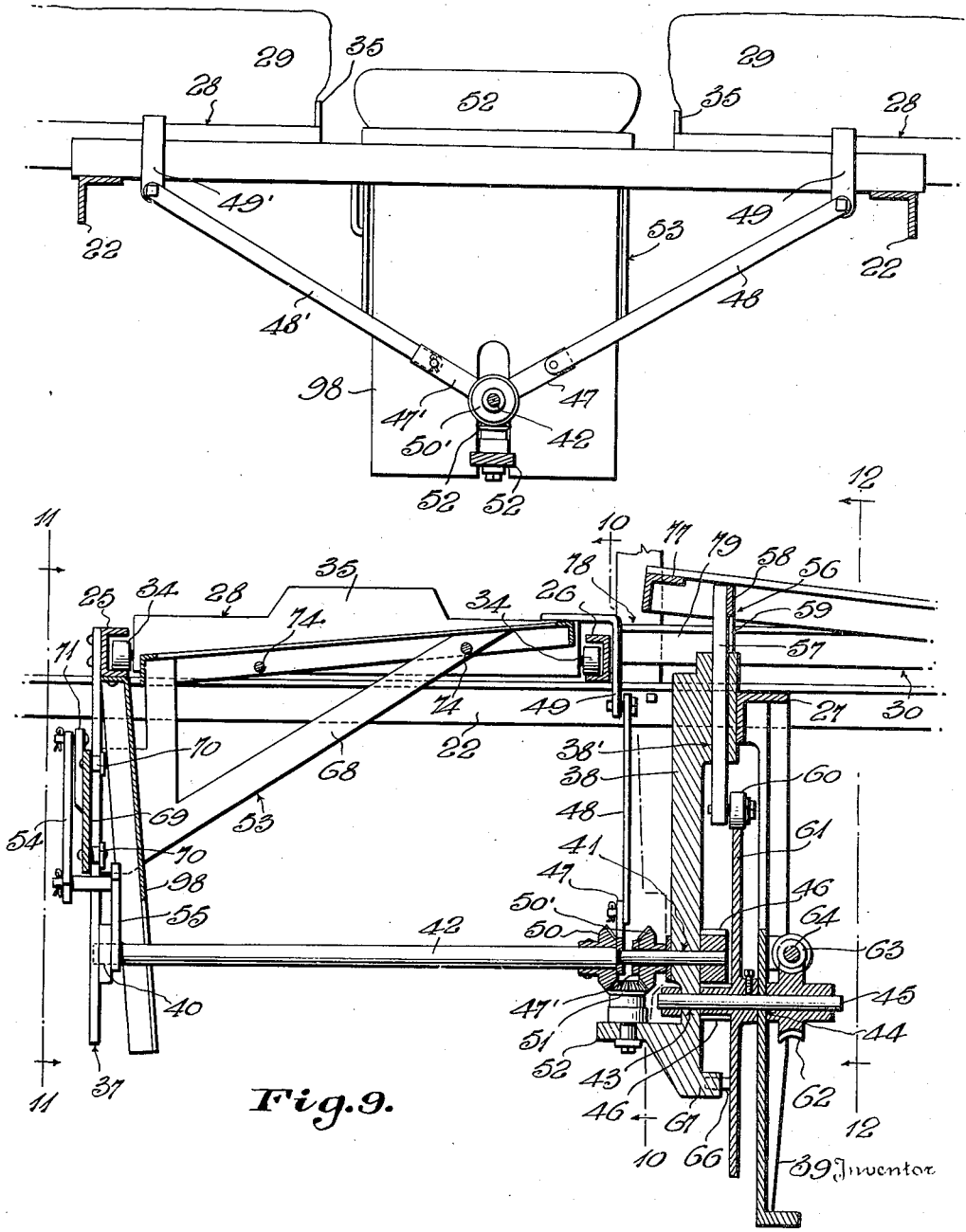

Sept. 24, 1940. A. COMPER 2,215,636
HOSPITAL BED
Filed April 6, 1938 9 Sheets-Sheet 8

Inventor
Adrian Comper
By H. R. Wilson Yeo
Attorneys

Sept. 24, 1940.   A. COMPER   2,215,636
HOSPITAL BED
Filed April 6, 1939   9 Sheets-Sheet 9

Inventor
Adrian Comper

Patented Sept. 24, 1940

2,215,636

UNITED STATES PATENT OFFICE 2,215,636

HOSPITAL BED

Adrian Comper, Pittsfield, Mass., assignor to Comper Manufacturing Company, a corporation of Massachusetts Application April 6, 1938, Serial No. 200,544

23 Claims. (Cl. 5—69)

The invention relates to hospital beds of the general type shown in U. S. patents to Adrian Comper, 1,884,577 of October 25, 1932, and 1,974,104 of September 18, 1934, and the following U. S. patents to Joseph E. Fazakerley: 1,203,721 of November 7, 1916; 1,257,072 of February 19, 1918; and 1,545,415 of July 7, 1925.

All of the above mentioned patents disclose a bed having a mattress composed of head and foot sections, and laterally separable hip-supporting sections; supporting means for said mattress sections including carriages for said hip sections, a bed pan elevator for elevating a bed pan into position between said hip sections when the latter are separated, and operating means for said carriages and said elevator. The above mentioned Comper patents also include a jack synchronized with the carriages and pan elevator for lifting one end of the head section of the mattress to elevate the patient's hips from said hip sections when the latter are to be moved. Beds of this general type have heretofore been rather complicated and expensive and have not always operated in the most perfect manner, but the present invention has aimed to so improve and simplify the construction as to provide a better bed at less cost.

With the above objects in view, and others which will become apparent as the description proceeds, the invention resides in the novel subject matter hereinafter described and claimed, description being accomplished by reference to the accompanying drawings.

Fig. 1 is a perspective view showing the improved bed with the mattress sections in places thereon, the head section being raised to free most of the patient's weight from the laterally separable hip sections, and the latter being partially separated in readiness for the elevator to raise the bed pan between them.

Fig. 2 is a perspective view with the mattress sections removed and illustrating the manner in which the bed may be adjusted to provide for "Gatch" or similar positions of the patient.

Fig. 3 is a top plan view of the central portion of the bed showing the carriages for the hip-supporting mattress sections in their normal inward positions.

Fig. 4 is a vertical longitudinal sectional view on line 4—4 of Fig. 3 showing the bed pan elevator and the operating means for the hip section carriages and said elevator, in elevation.

Fig. 5 is a vertical transverse sectional view on line 5—5 of Fig. 4 showing the positions of the carriage-operating arms and links when the carriages are in the innermost positions shown in Fig. 3.

Fig. 6 is a vertical transverse sectional view on line 6—6 of Fig. 4 showing the positions of the elevator operating arm and link when the elevator is in the lowered position of Fig. 4.

Fig. 7 is a transverse sectional view on line 7—7 of Fig. 4 showing the positions of the cam and jack, which raise the head section of the mattress prior to separation of the hip sections, in the positions which they occupy when the carriages occupy the inward positions shown in Fig. 5 and the elevator occupies the lowered position shown in Fig. 4.

Fig. 8 is a top plan view of the central portion of the bed showing the carriages separated to receive the ascending elevator and bed pan.

Fig. 9 is a central vertical longitudinal sectional view on line 9—9 of Fig. 8.

Fig. 10 is a vertical transverse sectional view on line 10—10 of Fig. 9 showing the relation of the carriage-operating arms and links when the carriages occupy the positions shown in Fig. 8, said arms and links being then on dead center.

Fig. 15 is a perspective view of the bed pan elevator.

Fig. 16 is a diagrammatic side elevation showing the bed in "Gatch" position and illustrating the manner in which the inner end of the foot section of the mattress may lie snugly against the patient's legs.

Figure 11:
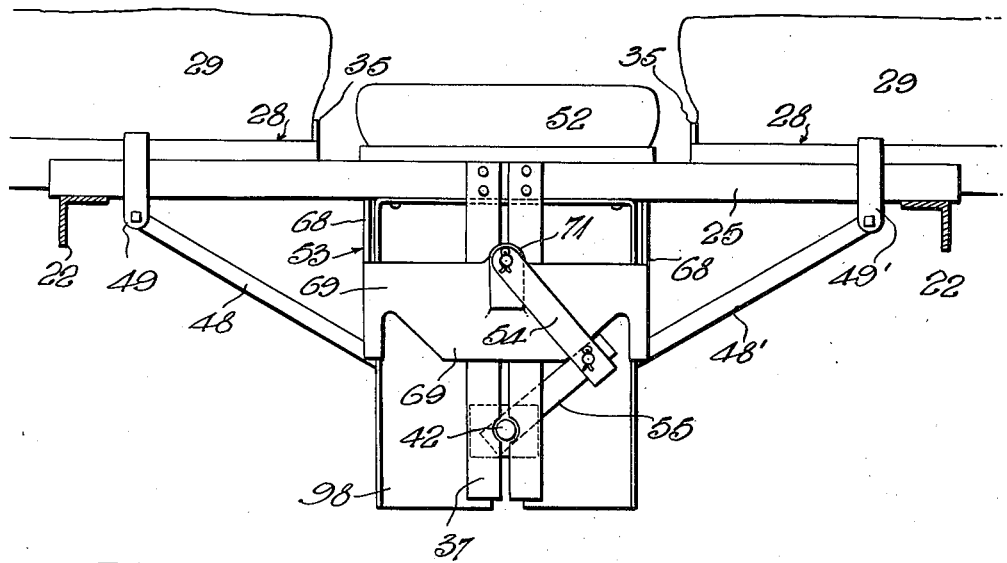
Fig. 11 is a transverse sectional view on line 11—11 of Fig. 9 showing the position of the elevator-operating arm and link when the elevator is in the partially raised position shown in Fig. 9.
Figure 12:
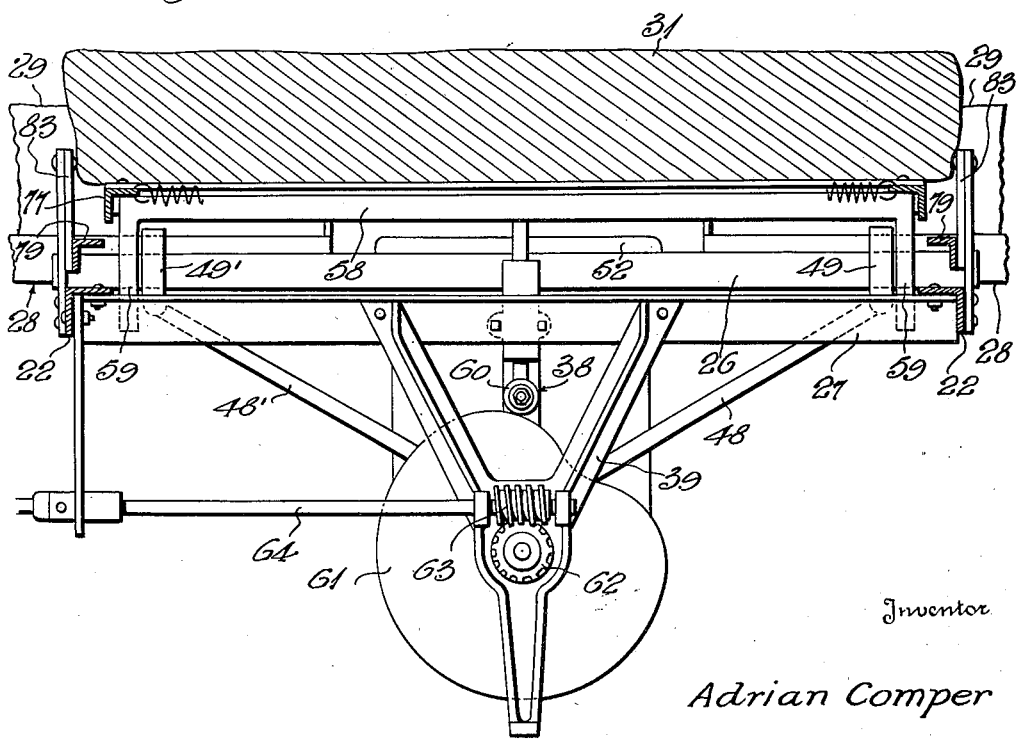
Fig. 12 is a transverse sectional view on line 12—12 of Fig. 9 showing the position of the cam and jack when the head section of the mattress occupies the raised position shown in Fig. 9.

Preferred features of construction have been shown and will be rather specifically described, with the understanding however, that variations may be made within the scope of the invention as claimed.

An appropriate head frame 20 and foot frame 21 are provided, connected by side rails 22, said side rails being preferably connected with each other by end bars 23 to provide a rectangular frame which is preferably detachably coupled at 24 to said head and foot frames. Two transverse track bars 25 and 26, and a third transverse bar 27 extend between and are suitably secured to the rails 22. The track bars 25 and 26 support two carriages 28 for the laterally separable hip sections 29 of the mattress. Between these carriages and the head frame 20, supporting means 30 is provided for the head section 31 of the mattress, and other supporting means 32 is provided between the carriages 28 and the foot frame 21, for supporting the foot section 33 of said mattress, said supporting means 30 and 32 being constructed as hereinafter described.

The carriages 28 may be engaged with the track bars 25 and 26 in any suitable way but it is preferable to provide said carriages with rollers 34 and to provide said track bars with channels in which said rollers are operable. The inner ends of these carriages are provided with upstanding flanges 35 to abut the inner ends of the hip sections 29, and the outer ends of said carriages are provided with upstanding arched members 36 to abut the outer ends of said hip sections, thus insuring that the latter shall move with the carriages when the latter are operated.

A vertical track 37 is secured to and projects downwardly from the transverse bar 25, and two brackets 38 and 39 are secured to and project downwardly from the transverse bar 27, said track 37 and bracket 38 being provided with horizontally alined bearings 40 and 41 respectively in which a relatively long horizontal shaft 42 is rotatably mounted. The brackets 38 and 39 are provided with horizontally alined bearings 43 and 44 in which a relatively short horizontal shaft 45 is rotatably mounted, the two shafts being geared together by suitable gearing 46. One arm 47 is secured to the shaft 42 and is connected by a link 48 with a lug 49 on one of the carriages 28. Another arm 47' is pivotally mounted upon the shaft 42 and is connected by a link 48' with a lug 49' on the other of the carriages 28. One bevel gear 50 is unitarily connected with the shaft 42 to rotate therewith and is preferably integral with the arm 47. A second bevel gear 50' is unitarily connected with the arm 47' and is freely turnable upon the shaft 42. A third bevel gear 51 meshes with the two gears 50 and 50' and is mounted on a lateral portion 52 of the bracket 38. Thus, when shaft 42 is turned in one direction to swing arm 47 in said direction, the gearing 50, 51 and 50' will cause swinging of the arm 47 in the opposite direction, and the two arms operate the two carriages 28.

The elevator for elevating the bed pan 52 between the hip sections 29 when the latter are separated, is shown at 53, said elevator being mounted for vertical movement upon the track 37 and being connected by a link 54 with an arm 55 secured to the shaft 42, said link and arm serving to raise and lower said elevator 53.

The jack 56 which effects raising of the head section 31 to lift the patient's weight from the hip sections 29 before separation of the latter, includes a vertical shank 57 slidable in an opening 38' in the upper portion of the bracket 38, and a head bar 58 rigid with the upper end of said shank, said head bar having downwardly projecting ends 59 lying slidably against the bar 27. The lower end of the shank 57 is provided with a roller 60 resting upon the peripheral edge of the heart-shaped cam 61 which forms the means for operating the jack 56, said cam 61 being secured to the short shaft 45. This shaft is provided with a worm wheel 62 meshing with a worm 63 on a transverse shaft 64, said shaft 64 having a hand crank 65 which is preferably mounted to swing to an out-of-the-way position when not in use. Upon rotation of this crank 65 in one direction, the cam 61 is operated to raise the jack 56, elevating the head section 31 to lift the patient's weight from the hip sections 29. These hip sections are laterally separated by the movement of the arms 47 and 47', and the elevator 53 raises the bed pan 52 between the separated hip sections 29, the cam 61 then serving to again lower the head section 31 so that the patient lies comfortably upon the bed and properly engaged with the pan 52. Upon rotation of the crank 65 in the opposite direction, the jack 56 raises the patient's weight from the hip sections 29, the elevator 53 lowers the bed pan 52, the hip sections 29 again move inwardly, and said jack 56 again lowers the head section 31, leaving the bed in condition for use as an ordinary bed.

Figure 13:
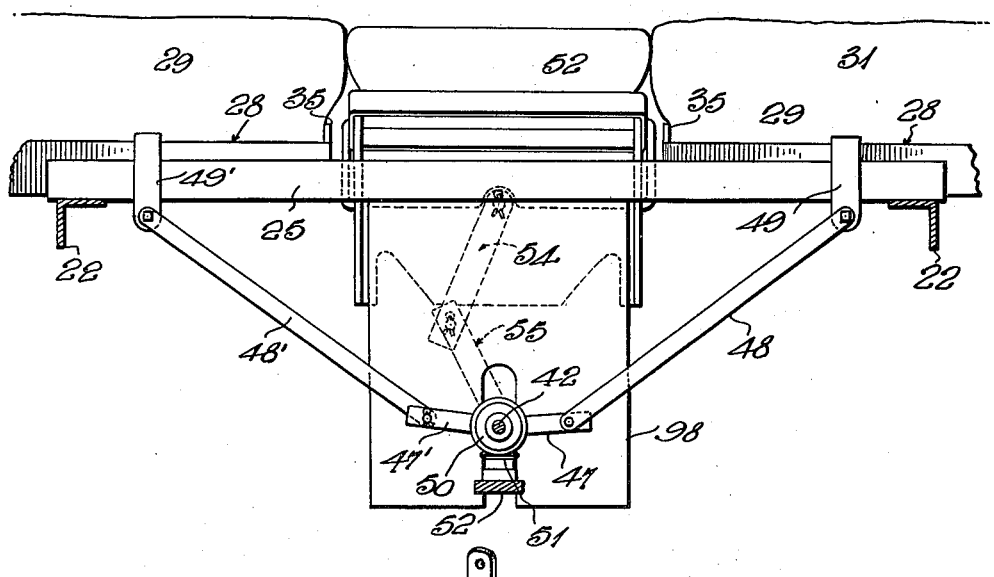
Fig. 13 is a transverse sectional view similar to Fig. 10 but showing the elevator and the pan fully raised and illustrating the manner in which the carriage-operating arms and links have moved the hip sections of the mattress inwardly against the pan.
Figure 14:
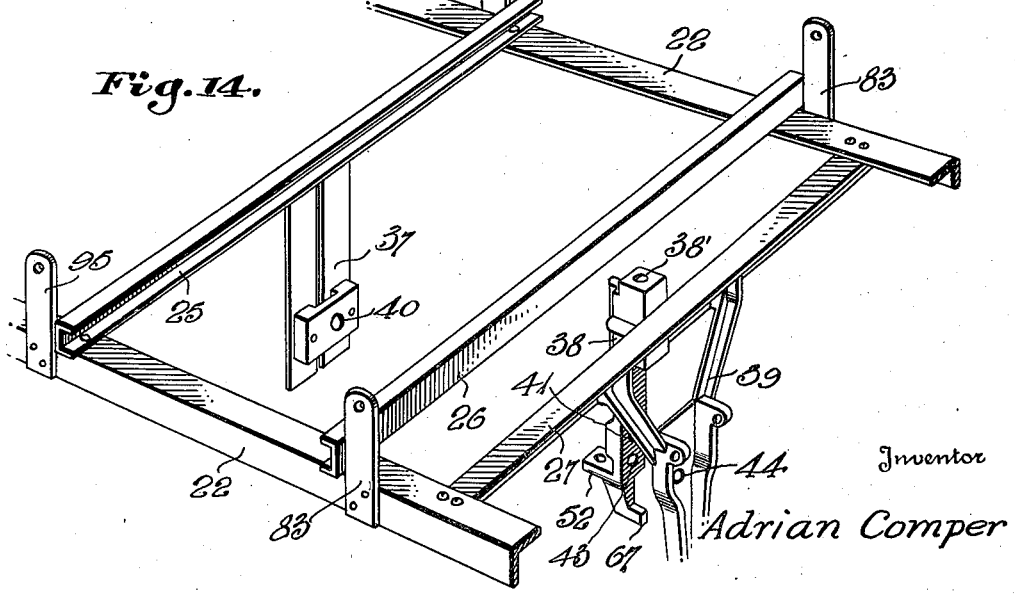
Fig. 14 is a perspective view of the central portion of the frame, showing principally the carriage-supporting tracks, the track upon which the elevator is mounted, and the brackets which are instrumental in mounting the operating means for the various movable parts.

The arcs of movement of the arms 47 and 47' and the synchronism of these arms with respect to the jack 56, are such that said arms outwardly move the carriages 28 only slowly and negligibly while the cam 61 is raising the jack 56, said arms then more rapidly completing the outward movement of said carriages. These carriages are moved outwardly to an excessive extent by the arms 47 and 47' as said arms swing from the normal positions shown in Fig. 5 to the dead center positions of Fig. 10. This permits the elevator 53 to raise the bed pan 52 between the excessively separated hip sections 29 without any interference by the latter. By the time the bed pan is almost fully raised, the arms 47 and 47' have swung downwardly below dead center as seen in Fig. 13, causing them to inwardly pull the carriages 28, thereby snugly positioning the hip sections 29 against the bed pan. After the pan has been used, rotation of the crank 65 in the opposite direction is effected, and the arc of movement of the arm 55 and the synchronism of this arm with respect to the arms 47 and 47' insure that said arms 47 and 47' shall again move the carriages 28 outwardly to their excessively separated positions to pull the hip sections 29 away from the bed pan 52, before the arm 55 causes appreciable descent of the elevator 53. This overcomes any possibility of the bed pan 52 being held between the hip sections 29 as the elevator lowers.

For limiting the movement of the parts in pan-lowering direction and also in pan-raising direction, a stop pin 66 is provided on the cam 61, said stop pin being cooperable with a lug 67 on the lower end of the bracket 38. Pin 66 strikes one side of the lug 67 to limit part movement in one direction, and strikes the opposite side of said lug to limit the movement in the other direction.

The pan elevator 53 preferably comprises suitable side frames 68 connected by a cross member 69 having rollers 70 engaging the track 37, said cross member 69 having a lug 71 to which the link 54 is pivoted. The side frames 68 rigidly support a top plate 72 having an opening 73 to receive the lower portion of the bed pan 52, and pan-supporting rods 74 are provided to directly support the pan bottom. A notch 75 extends from the opening 73 through one longitudinal edge of the top plate 72, said notch being sufficiently wide to accommodate an attendant's hand when he grasps the pan 52 by one edge to engage it with or remove it from the elevator 53. By providing the top plate 72 or its equivalent in this general form of a C with the ends of the C spaced sufficiently to accommodate the attendant's hand, the pan may be very conveniently placed upon or removed from the elevator by grasping said pan in the customary way.

The supporting means 30 for the head section 31 includes a suitable linked spring structure or the like 76 connected with a marginal rectangular frame 77. This frame 77 is partially surrounded by a U-shaped frame 78 whose side bars 79 overlie the rails 22. The end of the frame 77 toward the head frame 20 of the bed is pivoted upon transverse pivots 80 to the frame 78, and the end of said frame 78 toward the carriages 28, is pivotally mounted on the rails 22 by means including transverse pivots 81. A suitable hand-actuated adjuster 82 is supported by the rails 22 and suitably connected with the frame 78 for bodily raising and lowering the head ends of the two frames 77 and 78 to similarly incline the head section 31 of the mattress whenever desired, said adjuster including blocks 82' (Fig. 2) upon which said frame 77 rests. The end of the frame 77 toward the carriages 28, rests upon the head bar 58 of the jack 56 and when this jack is raised by the cam 61, said frame 77 is tilted about the pivots 80, raising the head section 31 throughout its width without distorting the shape of this head section.

In the preferred construction, short upstanding posts 83 are secured to the side bars 79 of the frame 78 and other short upstanding posts 83' are secured to the side rails 22, the upper ends of these posts being connected by the pivots 81. The posts 83 engage the edges of the mattress section 31 to prevent the latter from shifting laterally upon the bed. The head end of the frame 78 is preferably provided with an arched member 84 to prevent any shifting of the section 31 toward the head end of the bed, insuring that it shall remain in proper cooperative relation with the hip sections 29. When the two frames 77 and 78 are swung upwardly by operating the adjuster 82, the pivots 81 and the posts 83 and 83' cause these frames to swing somewhat toward the head of the bed, preventing the head section 31 of the mattress from being forcibly crowded against the hip sections 29. The pivots 81, due to the posts 83 and 83', are close to the upper front corner of the head section 31, higher than otherwise possible, placing them near the "theoretical pivot" of said head section 31. I thus overcome the necessity of the section 31 sliding upon the linked spring structure 76 upon swinging the two upwardly, as would be required if the pivots 81 were disposed near the lower front corner of said head section 31. Consequently, I am enabled to make use of the arched member 84 attached to the supporting means for the section 31, to hold this section against sliding toward the head of the bed by accident, insuring that no uncomfortable gap shall exist between said head section and the hip sections 29. Moreover, should it be desired to serve the pan with the head section 31 swung upwardly, separation of the hip sections 29 will not be interfered with by said head section 31, due to the location of the pivots 81 preventing crowding of said head section against said hip sections.

The means 32 for supporting the foot section 33 of the mattress, includes a frame 85. This frame is pivotally mounted upon the rails 22 in the same manner in which the frame 78 is mounted upon said rails and with similar advantages. The frame 85 is composed of two sections 87 and 88 pivoted to each other at 89 to permit upward buckling under the patient's knees. A suitable adjuster 90 is provided for effecting this buckling of the frame 85, and appropriate provision 91, 92, may be provided to hold the frame section 88 when swung vertically to any desired extent from the rails 22. A spring link structure 93 or the like is connected with the frame 85 to yieldably support the foot section 33 of the mattress. The posts 94 and 95 associated with the pivots 86 hold this foot section 33 against lateral sliding, and an arched member 96 is provided on the foot end of the frame section 88 to hold said foot section against sliding away from the hip sections 29, preventing an uncomfortable gap.

During upward buckling of the sections 87 and 88 to the "Gatch" position of Fig. 16, the inner or rear end of the mattress foot section 33 will not be crowded against and held by the hip sections 29, due to the location of the pivots 86 near the upper rear or inner corner of said section 33. Therefore, said rear or inner end of the section 33 may rise from the frame section 87 and snugly underlie the patient's legs to comfortably support the same. Moreover, if the pan is to be served with the sections 87 and 88 upwardly buckled to some extent, separation of the hip sections 29 will not be interfered with by the foot section 33, as the latter cannot crowd against said hip sections, due to the location of the pivots 86.

By constructing and mounting the mattress section supporting means 30 and 32 as above described and making suitable provision for adjusting them, the patient may be readily placed in "Gatch" or similar positions, and obviously the bed pan may be served whether the patient be in one of these positions or be lying stretched out upon the mattress. When the frames 77 and 78 are bodily swung upwardly upon the pivots 81 to place the patient in a reclining or sitting position, the frame 77 rises somewhat from the head bar 58 of the jack 56. Thus if the bed pan is to be then served, the jack will not immediately raise the frame 77, and when finally engaging said frame will raise it such a short distance as to prevent discomfort to the patient.

From the foregoing taken in connection with the accompanying drawings, it will be seen that I have made novel and advantageous provision for operating the carriages 28, the elevator 53 and the jack 56; that I have provided an improved structure whereby the jack 56 does not distort the head section 31 but raises the latter throughout its width and length without distortion; that I have provided a new and improved elevator construction permitting advantageous placing and removal of the bed pan; that I have made unique provision in a bed of the type set forth for placing the patient in "Gatch" or similar positions; that the bed permits serving of the bed pan regardless of the position in which the patient be supported; that novel provision has been made to prevent the hip sections 29 from holding the bed pan against descent with the elevator 53; and that I have provided a generally improved and simplified construction.

A suitable casing 97 (shown only in Figs. 1 and 2) may be provided around the cam 61, gearing 50, 50', 51, 46, and arms 47, 47' and a guard plate 98 may be employed at the inner side of the track 37. If desired, this plate 98 could form part of a housing (not shown) for the elevator operating parts 54 and 55.

While preferred features have been disclosed, attention is again invited to the possibility of making variations within the scope of the invention as claimed.

What is claimed is:

1. In a hospital bed of the type having a mattress including laterally separable hip sections, carriages for said hip sections, and a frame on which said carriages are mounted; two arms below the inner ends of said carriages, means pivotally mounting said arms on said frame upon a common axis extending longitudinally of the bed, two links connecting said arms with said carriages respectively, and means for simultaneously swinging said arms in opposite directions to operate said carriages.

2. In a hospital bed of the type having a mattress including laterally separable hip sections, carriages for said hip sections, and a frame on which said carriages are mounted; two arms, means mounting said arms on said frame below the inner ends of said carriages for pivotal movement about a common axis extending longitudinally of the bed, connecting means connecting said arms with said carriages respectively, two bevel gears unitarily connected with said arms respectively, a third bevel gear mounted on said frame between said two bevel gears and meshing therewith, and means for rotating said gears, whereby the arms will be swung in opposite directions.

3. In a hospital bed of the type having a mattress composed of head, foot, and laterally separable hip sections, carriages for said hip sections, an elevator for elevating a bed pan between said hip sections when the latter are separated, and a frame upon which said carriages and said elevator are mounted, a shaft mounted rotatably on said frame under said elevator and extending longitudinally of the bed, one arm secured to said shaft and operatively connected with said elevator for operating the same, a second arm secured to said shaft and operatively connected with one of said carriages for operating the same, a third arm and means swingably mounting the same coaxially with said shaft, said third arm being operatively connected with the other of said carriages for operating the same, means whereby said shaft swings said third arm reversely from said second arm when said shaft is rotated, and means for rotating said shaft in one direction to separate said carriages and raise said elevator, and in the other direction to lower said elevator and return said carriages to their normal positions.

4. In a hospital bed of the type having a mattress composed of head, foot, and laterally separable hip sections, carriages for said hip sections, an elevator for elevating a bed pan between said hip sections when the latter are separated, and a frame upon which said carriages and said elevator are mounted; a shaft mounted rotatably on said frame under said elevator and extending longitudinally of the bed, one arm secured to said shaft and linked to said elevator for operating the same, a second arm secured to said shaft and linked to one of said carriages for operating the same, a third arm and means swingably mounting the same coaxially with said shaft said third arm being linked to the other of said carriages for operating the latter, motion-transmitting means connecting said shaft and third arm for causing said shaft to swing said third arm reversely from said second arm when said shaft is rotated, and means for rotating said shaft in one direction to separate said carriages and raise said elevator, and in the other direction to lower said elevator and return said carriages to their normal positions.

5. In a hospital bed of the type having a mattress composed of head, foot, and separable hip sections, carriages for said hip sections, jack means under said head section for raising and lowering the same, said jack means including an operating cam under said head section, an elevator under said hip sections for elevating a bed pan between them when they are separated, and a frame having mounting means for said carriages, said jack means and said elevator; a shaft mounted rotatably on said frame under said elevator, said shaft extending longitudinally of the bed, a second longitudinal shaft rotatably mounted on said frame at one end of the first mentioned shaft and carrying said cam, gearing connecting the two shafts for simultaneous rotation, means for rotating one of said shafts, and operating connections between said shafts and the carriages and elevator.

6. In a hospital bed of the type having a mattress composed of head, foot and separable hip sections, carriages for said hip sections, jack means under said head section for raising and lowering the same, said jack means including an operating cam under said head section and disposed in a plane transverse to the bed, an elevator under said hip sections for elevating a bed pan between said hip sections when the latter are separated, and a frame having mounting means for said carriages, said jack means, and said elevator; a shaft mounted rotatably on said frame under said elevator, said shaft extending longitudinally of the bed and being disposed at one side of said cam, gearing connecting said shaft with said cam and means for rotating one of these members to cause said gearing to rotate the other, one arm secured to said shaft, means operatively connecting said one arm with said elevator for operating the same, a second arm secured to said shaft, connecting means operatively connecting said second arm with one of said carriages for operating the same, a third arm and means swingably mounting the same coaxially with said shaft, connecting means operatively connecting said third arm with the other of said carriages for operating the same, and motion transmitting means between said shaft and said third arm for swinging the latter reversely from said second arm when said shaft is rotated.

7. In a hospital bed of the type having a mattress composed of head, foot, and separable hip sections, carriages for said hip sections, and an elevator for elevating a bed pan between said hip sections when the latter are separated; a frame upon which said carriages are mounted, said frame including two transverse bars spaced apart longitudinally of the bed, a vertical track secured to and projecting downwardly from one of said transverse bars, said elevator being mounted on said track, a bracket secured to and projecting downwardly from the other of said transverse bars, the lower end of said track and said bracket having horizontally alined bearings, a shaft rotatably mounted in said bearings, one arm secured to said shaft and operatively connected with said elevator for operating the same, a second arm secured to said shaft and operatively connected with one of said carriages for operating the same, a third arm swingably mounted upon said shaft and operatively connected with the other of said carriages for operating the same, two bevel gears unitarily connected with said second and third arms respectively, a third bevel gear mounted on said bracket and meshing with said two bevel gears to cause said third arm to swing reversely from said second arm when said shaft is rotated, and means for rotating said shaft.

8. In a hospital bed of the type having a mattress composed of head, foot, and laterally separable hip sections, jack means for raising and lowering said head section, including a jack shank and an operating cam therefor, and an elevator for elevating a bed pan between said hip sections when the latter are separated; a frame upon which said carriages are mounted, said frame including two transverse bars spaced apart longitudinally of the bed, a vertical track secured to and projecting downwardly from one of said transverse bars, said elevator being mounted on said track, a bracket secured to and projecting downwardly from the other of said transverse bars, said jack shank being guided by said bracket, the lower end of said track and said bracket being provided with horizontally elongated bearings, a shaft rotatably mounted in said bearings, means actuated by said shaft and operatively connected with said elevator and said carriages for operating the same, a second bracket secured to said other of said transverse bars and projecting downwardly therefrom near the first mentioned bracket, the two brackets being provided with horizontally alined bearings, a second shaft mounted in these bearings and carrying the aforesaid cam, gearing operatively connecting the two shafts, and means for rotating one of said shafts.

9. In a hospital bed of the type having a mattress composed of head, foot and laterally separable hip sections, carriages for said hip sections, an elevator for elevating a bed pan between said hip sections when the latter are separated, and a frame upon which said carriages and said elevator are mounted; means mounted on said frame for separating said carriages and for raising said elevator, said means being operable to first move said carriages outwardly from the raised elevator and afterward to lower said elevator, thereby preventing said hip sections from holding the bed pan while the elevator descends.

10. In a hospital bed of the type having a mattress composed of head, foot and laterally separable hip sections, carriages for said hip sections, an elevator for elevating a bed pan between said hip sections when the latter are separated, and a frame upon which said carriages and elevator are mounted; operating means mounted on said frame for separating said carriages and for raising said elevator, said means being operable to first excessively separate said carriages to allow the ascending bed pan to clear the separated hip sections, and afterward to move the excessively separated carriages inwardly toward the raised elevator to position said hip sections snugly against the raised bed pan, said means being also operable to move said carriages outwardly from the raised elevator before the latter moves appreciably, thereby similarly moving said hip sections and preventing them from holding the bed pan while the elevator descends.

11. In a hospital bed having a mattress composed of head, foot and laterally separable hip sections, carriages for said hip sections, an elevator for elevating a bed pan between said hip sections when the latter are separated, and a frame upon which said carriages and elevator are mounted; operating means for said elevator mounted on said frame, operating means for said carriages mounted on said frame and including two arms, means pivotally mounting said arms for swinging in opposite directions, and means operatively connecting said arms with said carriages respectively; said arms and said connecting means cooperating to first excessively separate said carriages and the hip sections thereon and to then move the excessively separated carriages and hip sections inwardly, and said elevator-operating means and said carriage-operating means being so synchronized that the elevator positions the bed pan between the hip sections before the latter are inwardly moved from their excessively separated positions, and the elevator will not lower the pan until said hip sections are again excessively separated.

12. In a hospital bed of the type having a mattress composed of head, foot and laterally separable hip sections, carriages for said hip sections, an elevator for elevating a bed pan between said hip sections when the latter are separated, and a frame upon which said carriages and elevator are mounted; a shaft extending longitudinally of the bed under said elevator and mounted rotatably on said frame, elevator-operating means operatively connected with said shaft for raising said elevator when said shaft is rotated in one direction and vice versa, one arm secured to said shaft, means operatively connecting said one arm with one of said carriages for operating this carriage, another arm pivotally mounted coaxially with said shaft, means operatively connecting said other arm with the other of said carriages for operating this carriage, and motion-transmitting means between said shaft and said other arm for swinging the latter reversely from said one arm when said shaft is rotated, said arms and said connecting means cooperating to first excessively separate said carriages and the hip sections thereon and to then move the excessively separated carriages and hip sections inwardly, said elevator-operating means and said arms being so synchronized that the elevator positions the bed pan between the hip sections before the latter are inwardly moved from their excessively separated positions and the elevator will not lower the pan until said hip sections are again excessively separated.

13. A structure as specified in claim 3; the normal positions of the three arms and their arcs of movement being such that said second and third arms first excessively separate said carriages before the first mentioned arm completely raises said elevator and then move said carriages inwardly toward the completely raised elevator, whereby upon reverse movement of the three arms, said second and third arms will move said carriages outwardly from the elevator before the first mentioned arm lowers said elevator.

14. A structure as specified in claim 5; said second and third arms and the connecting means connected therewith being operable to only slowly and negligibly separate said carriages while said jack is raising said head section and to then more rapidly complete the separation of the carriages.

15. A structure as specified in claim 6; said second and third arms and the connecting means connected thereto being operable to only slowly and negligibly separate said carriages and hip sections thereon while said jack is raising said head section, to then more rapidly move said carriages and hip sections to excessively separated positions and to then move said carriages and hip sections inwardly; said one arm and the connecting means connected thereto being operable to lift said elevator to the maximum before said carriages and hip sections are moved inwardly from said excessively separated positions and to lower said elevator after said carriages and hip sections have again been moved to said excessively separated positions.

16. In a hospital bed of the type having a mattress composed of head, foot, and hip sections laterally separable for bed pan serving; a support for said head section including a marginal frame, a second frame surrounding and carrying said marginal frame and pivotally mounted near said hip sections on an axis extending transversely of the bed, the end of said marginal frame toward the head of the bed being pivoted to said second frame on an axis parallel with the aforesaid axis, means whereby the head ends of both of said frames may be bodily raised about the pivotal axis of said second frame, and means whereby the other end of said marginal frame may be raised about the pivotal axis of this frame when said hip sections are to be separated preparatory to serving the pan.

17. In a hospital bed of the type having a mattress including hip sections laterally separable for bed pan serving, and a relatively large section in abutting relation with said hip sections; an upwardly swingable support for said large section, and means pivotally mounting said support on an axis extending transversely of the bed, said axis being near the upper inner corner of said large section and relatively distant from the lower inner corner thereof, whereby upward swinging of said support to upwardly swing said large section will not crowd said large section against said hip sections and will not therefore slide said large section upon said support nor interfere with separation of said hip sections if the pan is to be served with said large section swung upwardly.

18. In a hospital bed of the type having a mattress including a relatively large head section and relatively small hip sections laterally separable for bed pan serving; an upwardly swingable support for said head section, means pivotally mounting said support on an axis extending transversely of the bed, said axis being near the upper front corner of said head section and relatively distant from the lower front corner thereof, whereby said head section will not crowd against said hip sections when said support is swung upwardly and will not therefore interfere with separation of said hip sections if the pan is to be served with said head section upwardly swung, and means on the head end of said support to abut the adjacent end of said head section and hold the latter against accidental movement away from said hip sections.

19. In a hospital bed of the type having a mattress including a relatively large foot section and relatively small hip sections laterally separable for bed pan serving; supporting means for said foot section including an upwardly swingable support for the portion of said foot section toward said hip sections, means pivotally mounting said support on an axis extending transversely of the bed, said axis being near the upper rear corner of said foot section and relatively distant from the lower rear corner thereof whereby said foot section will not be crowded against said hip sections when said support is swung upwardly and will not therefore interfere with separation of said hip sections if the pan is to be served with said foot section swung upwardly, and means on the foot end of said foot section supporting means to abut the adjacent end of said foot section and hold the latter against accidental movement from said hip sections.

20. In a hospital bed of the type having a mattress composed of relatively large head and foot sections and relatively small hip sections laterally separable for pan serving; fixed side rails extending longitudinally of the bed, supporting means for one of said relatively large sections including a frame having side bars adjacent said rails, short upstanding posts secured to the ends of said side bars toward said hip sections, additional short upstanding posts secured to said rails at the outer sides of the first mentioned posts, transverse pivots connecting said first mentioned posts with said additional posts, said pivots being disposed near the upper inner corner of said one large section and relatively distant from the lower inner corner of this section to prevent the latter from crowding against said hip sections and interfering with separation of the same when said frame is swung upwardly, and means for vertically adjusting said frame about said pivots.

21. In a hospital bed of the type having a mattress composed of head, foot and hip sections laterally separable for pan serving, and a jack for raising said head section to free the patient's weight from said hip sections before separating the latter; a support upon which the aforesaid head section of said mattress rests, means pivotally mounting said support to allow upward swinging of the end thereof toward said hip sections, said end of said support extending throughout the width of said head section and overlying said jack to be raised by the latter.

22. In a hospital bed of the type having a mattress composed of head, foot and hip sections laterally separable for pan serving, and a jack for raising said head section to free the patient's weight from said hip sections before separating the latter; a horizontal head bar for said jack extending transversely of the bed, and a support upon which the aforesaid head section of the mattress rests, said support extending throughout the length and width of said head section and having a marginal frame, and means pivotally mounting said marginal frame to allow upward swinging of the end thereof toward said hip sections, said end of said marginal frame resting on said head bar of said jack to be raised thereby.

23. In a hospital bed having a mattress composed of head, foot and laterally separable hip sections, carriages for said hip sections, an elevator for elevating a bed pan between said hip sections when the latter are separated, and a frame upon which said carriages and said elevator are mounted; two vertically swingable inclined arms under said carriages, pivot means at the upper ends of said arms and mounting said arms on said frame on pivotal axes extending longitudinally of the bed, said arms normally diverging downwardly, whereby said arms are disposed toward opposite sides of the bed, one inclined link connecting the arm at the right side of the bed with the carriage at the left side of the bed, a second inclined link connecting the arm at the left side of the bed with the carriage at the right side of the bed, said links normally crossing each other, means for swinging said right arm upwardly and toward the left side of the bed and for swinging said left arm upwardly and toward the right side of the bed until the two arms first excessively separate said carriages and then move said carriages inwardly toward each other, and operating means for said elevator for disposing the same substantially at its extreme raised position while said carriages are excessively separated, said elevator-operating means being operable when said arms are swung back toward their original positions, to delay elevator lowering until said arms have again moved said carriages to their excessively separated positions.

ADRIAN COMPER.